United States Patent
Carter, Jr.

[11] Patent Number: 6,155,784
[45] Date of Patent: Dec. 5, 2000

[54] VARIABLE PITCH AIRCRAFT PROPELLER

[75] Inventor: Jay W. Carter, Jr., Burkburnett, Tex.

[73] Assignee: Cartercopters, LLC., Wichita Falls, Tex.

[21] Appl. No.: 09/004,692

[22] Filed: Jan. 8, 1998

Related U.S. Application Data

[60] Provisional application No. 60/035,032, Jan. 9, 1997.

[51] Int. Cl.[7] .............................. B64C 11/06; B64C 11/26; B64C 27/48; B64C 27/33
[52] U.S. Cl. ..................... 416/134 A; 416/138; 416/139; 416/168 R; 416/223 R; 416/226; 416/228; 416/230; 416/231 R; 416/238; 416/244 R; 416/245 R
[58] Field of Search ................................ 416/134 A, 138, 416/139, 141, 145, 168 R, 223 R, 226, 228, 230, 231 R, 238, 244 R, 245 R

[56] References Cited

U.S. PATENT DOCUMENTS

| | | |
|---|---|---|
| 2,276,262 | 3/1942 | Caldwell et al. . |
| 2,302,068 | 11/1942 | Stanley . |
| 2,399,828 | 5/1946 | Roche . |
| 2,419,893 | 4/1947 | Hackethal . |
| 2,845,131 | 7/1958 | Laufer ...................................... 416/145 |
| 3,647,317 | 3/1972 | Furlong et al. . |
| 4,104,003 | 8/1978 | Mouille . |
| 4,281,966 | 8/1981 | Duret et al. . |
| 4,345,876 | 8/1982 | Schwarz et al. . |
| 4,369,018 | 1/1983 | Brunsch et al. . |
| 4,948,339 | 8/1990 | Adamson . |
| 4,966,527 | 10/1990 | Merz . |
| 5,042,968 | 8/1991 | Fecto . |
| 5,209,643 | 5/1993 | Cole . |
| 5,269,658 | 12/1993 | Carlson et al. . |
| 5,496,002 | 3/1996 | Schutze . |

*Primary Examiner*—Christopher Verdier
*Attorney, Agent, or Firm*—Felsman Bradley Vaden Gunter & Dillon, LLP; James E. Bradley

[57] ABSTRACT

A propeller for aircraft has a tip-to-tip flex-beam spar and torsionally stiff hollow blades bonded to the spar throughout an outer portion of the blades. The spar has two end caps which are separated from each other at the hub and converge in the outer portion. The blades have an inner region which is not bonded to the spar, allowing an inner portion of the spar to twist during pitch changes. A counterweight is mounted to an arm extending from an inner end cuff of each blade. The counterweight is located out of the plane of rotation. The counterweight is also located on a side of a line opposite from the trailing edge, the line passing through the pivot axis perpendicular to the plane of rotation.

14 Claims, 6 Drawing Sheets

VARIABLE PITCH AIRCRAFT PROPELLER

This application is based on provisional application 60/035,032, filed Jan. 9, 1997 entitled Variable Pitch Aircraft Propeller.

TECHNICAL FIELD

This invention relates to a variable pitch propeller for aircraft and in particular to a propeller blade assembly having an internal load bearing twistable spar and blades which twist the spar for pitch changes.

BACKGROUND ART

Conventional variable pitch propellers have a hub and separate blades, the blades having circular cross sections at the root so that the blades pivot on bearings for pitch change. High centrifugal force requires a strong and heavy hub and bearings. Making matters worse, the circular root cross section results in high out-of-plane stiffness, so that gyroscopic loads and any unbalance between centrifugal force and thrust causes a bending moment around the hub-blade intersection, causing a stress that adds to centrifugal force-induced stress. The circular root cross section also results in drag but no thrust, reducing propeller efficiency.

A flexible beam design has been applied to helicopter main rotors (e.g. U.S. Pat. No. 4,332,525), helicopter tail rotors (e.g. U.S. Pat. No. 4,381,902), and wind turbines (e.g. U.S. Pat. No. 4,522,564), but the prior art does not disclose solutions to the problems experienced in application to aircraft propellers.

DISCLOSURE OF INVENTION

Accordingly, a primary object of this invention is a variable pitch propeller in which the structural characteristics and aerodynamic characteristics are more independent of each other than in prior art propellers.

A further primary object of this invention is a variable pitch propeller achieving higher efficiency than the prior art by allowing an airfoil shape all the way to the propeller root.

A further primary object of this invention is a variable-pitch propeller that is much lighter in weight than the prior art for a given horsepower rating.

A further primary object of this invention is a variable-pitch propeller adaptable to both tractor and pusher configurations.

A further primary object of this invention is a variable-pitch propeller without centrifugal force carrying bearings.

A further primary object of this invention is a variable-pitch propeller having high in-plane stiffness and low out-of-plane stiffness.

A further object of this invention is a variable-pitch propeller having streamlined intersection with the spinner.

In accordance with these objects, the propeller assembly of this invention has a hub adapted to be connected to a drive shaft for rotation therewith. A propeller blade is located on each side of the hub, each of the blades having a tip. A propeller spar is mounted to the hub and extends continuously from one of the tips to the other of the tips. The spar has two spar caps separated from each other at the hub. Each of the blades is mounted to and encloses the spar caps. Each blade has an inner portion which is hollow and twists the spar for pitch changes.

BRIEF DESCRIPTION OF THE DRAWINGS

FIG. 2b is an enlarged view of the propeller root portion as shown in FIG. 2a.

BEST MODE FOR CARRYING OUT THE INVENTION

Figures 1, 2A:
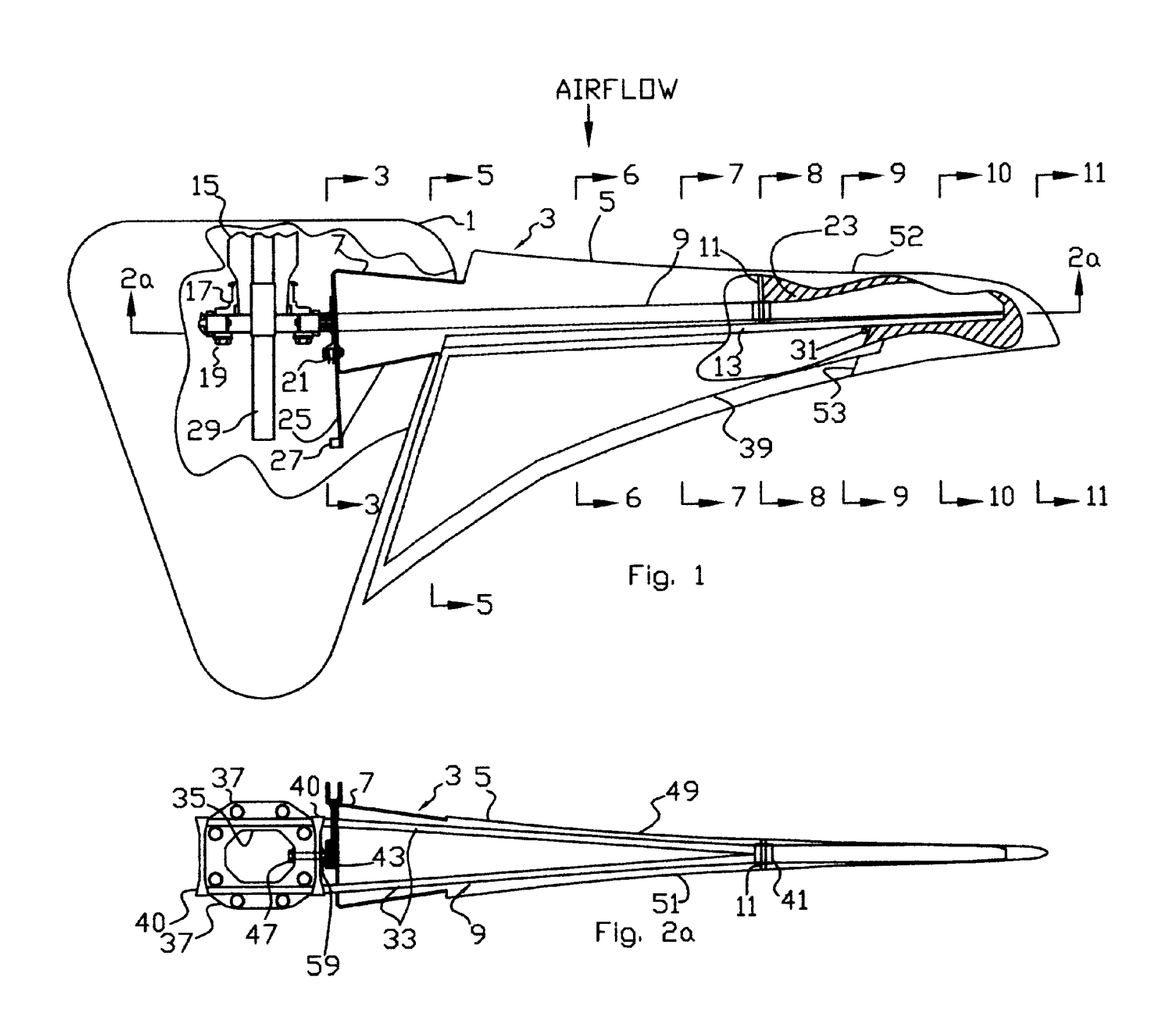
FIG. 1 is a top view through one half of a pusher propeller, with a portion of the spinner cut away and a portion of the propeller blade cut away.
FIG. 2a is a rear view section of the pusher propeller of FIG. 1 taken along the lines 2a—2a of FIG. 1.

FIG. 1 is a top view of a spinner 1 and half of a pusher-type aircraft propeller 3, in which portions of the spinner and the propeller top skin are cut away to expose the interior. Shown is a blade 5, a cuff 7, a spar 9, a rib 11, a shear web 13, a drive shaft 15 having a drive shaft flange 17, propeller bolts 19, a pitch horn 21, bonding mix 23, a weight arm 25, a weight 27, a pitch control rod 29, and a vent hole 31. Spar 9 is bolted to drive shaft flange 17 by propeller bolts 19. Drive shaft 15 will be aligned along a longitudinal axis of the aircraft.

FIG. 2a shows a spanwise section through half of propeller 1 taken along the lines 2a—2a. Spar 9 has two spar caps 33 and extends as one piece from station 42.75 (near section line 11—11) on the propeller half shown to station 42.75 on the propeller half not shown. As used herein, reference to particular stations is that position on the propeller 3 measured in inches from the axis of rotation of the propeller. Reference to specific dimensions or measurements is used for ease of description only.

Spar 9 includes a root block 35, root block extensions 37, spar caps 33 and circumferential windings 39,41. Root block 35 is a rectangle about one inch thick made of many layers of high modulus composite in an epoxy resin, having a large hole in the center, the corners having bolt holes reinforced by metallic inserts. Root block 35 is bonded between and separates spar caps 33. Root block extensions 37 are of the same thickness and construction and are bonded on outer edges of spar caps 33. Together, root block 35 and root block extensions 37 provide eight holes for bolting propeller 3 to the drive shaft flange 17, and thus may be considered a hub. The hole in the center of the root block 35 is to allow penetration of the pitch control pushrod 29 (FIG. 1), which is concentric with the driveshaft 15. Spar caps 33 pass continuously from one blade tip, between root block 35 and root block extensions 37, to the other blade tip, with the two spar caps 33 becoming a solid rectangular spar at station 28.5 (section line 8—8), then the rectangle progressively changing shape to fit inside the blade tip, as will be described further on. The distance between spar caps 33 at the root is selected to provide sufficient in-plane stiffness so that the first in-plane natural frequency of the propeller/spar combination is greater than the highest rotation rate at which the propeller will be turned. Spar 9 has a ratio of in-plane stiffness to out-of-plane stiffness exceeding 20.

The distance between spar caps 33 preferably tapers toward the tip to reduce the centrifugal-force-induced twisting moment in order to minimize the forces necessary for pitch control. Torsional softness is achieved by minimizing the largest diameter that can be placed into the cross section of the spar cap 33. Because of the triangular arrangement of the spar caps 33 formed by their separation at the root and their junction at the tips, and the fact that the largest loads are tensile loads due to centrifugal force, there is little chance of compressive buckling failure, and so spar caps 33 do not need an intermediate shear web. In other words, in the inner portion between root block 35 and station 28.5 at section line 8—8, spar caps 33 are not connected to each other by any structural member. Spar caps 33 are made of unidirectional high-modulus fibers, such as graphite, the fibers aligned parallel to the span, in an epoxy matrix.

Figure 2B:
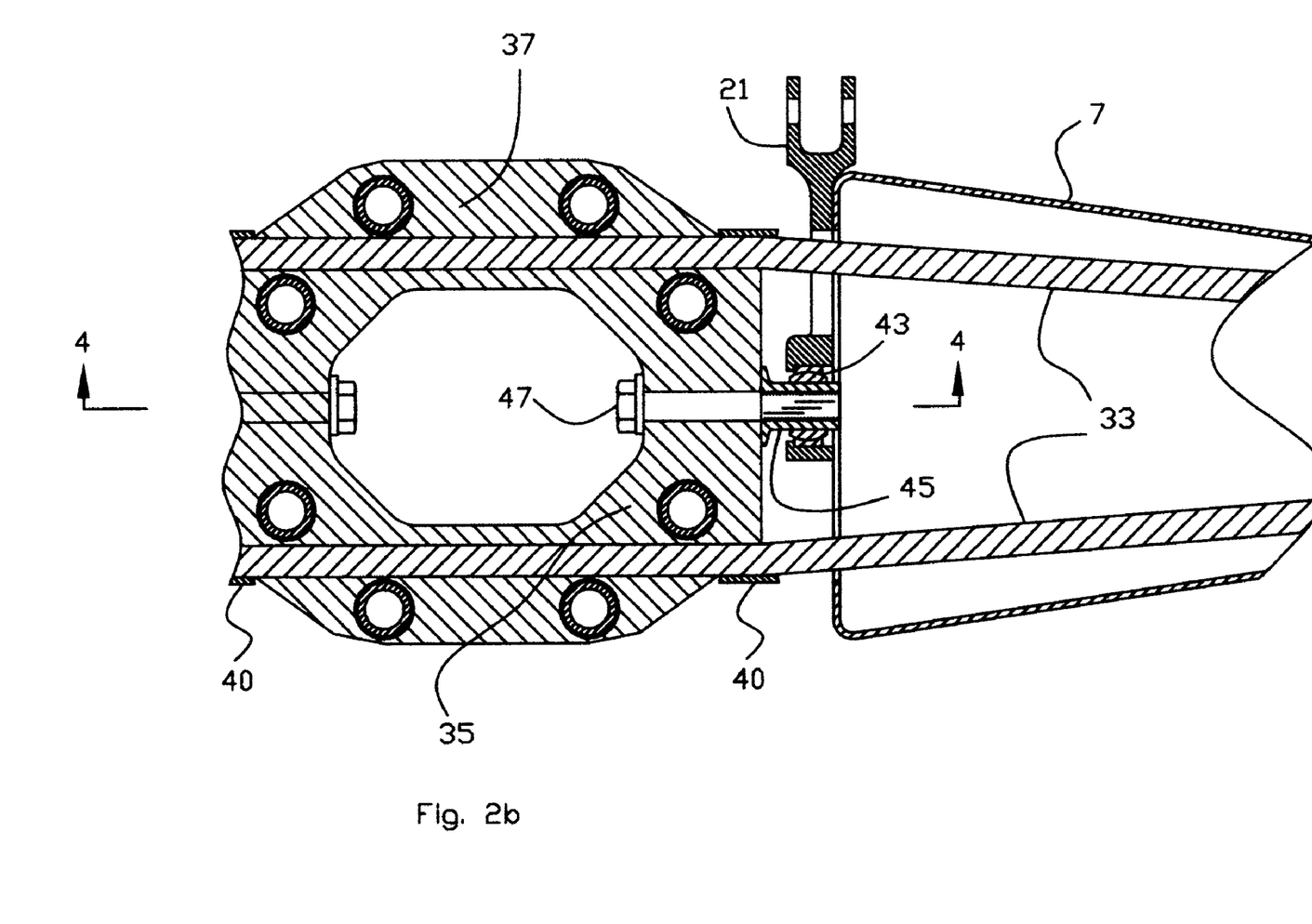

As shown in FIG. 2b, circumferential windings 40 at root block 35 strengthen the junction between spar caps 33 and root block 35 and are helpful because torque on root block 35 tends to separate spar caps 33. FIG. 2b also shows spherical bearing 43 which is mounted on the end of blade cuff 7. Spherical bearing 43 slidably engages pin 45, which is bolted to root block 35 by bolt 47. As shown in FIGS. 1 and 2a, circumferential windings 41 in the outer portion strengthen the junction between spar caps 33 where they meet toward the tip and are helpful because the spar caps 33 change direction at this point to become parallel with each other, so centrifugal force tends to separate them.

Spar caps 33 are constructed with approximately 1.25 degrees of out-of-plane bend (just outboard of root block 35), in the same direction as the spar would bend because of thrust, known as pre-coning. Out of plane bend refers to a bend which is out of the plane of rotation of blades 5, the plane of rotation being perpendicular to drive shaft 15. Pre-coning minimizes bending stresses near the hub because thrust-induced bending is partially or fully canceled by centrifugal-force-induced bending in the other direction. The pre-coning angle is a compromise set to limit stresses at minimum coning and at maximum coning, thereby reducing the amount of material needed in the spar. The largest forward bending of the spar (maximum coning) occurs at maximum coefficient of lift of the propeller blade, and the largest rearward bending of the spar (minimum coning) occurs at minimum coefficient of lift, both regardless of rotation rate. Such a small amount of coning has no significant aerodynamic effect. A gap between blade 5 and spinner 1 is needed to allow for variation in the coning angle, in both directions from the rest position.

The spar thickness is determined by the need for flexibility in the out-of-plane direction to limit bending stresses when thrust-induced and centrifugal-force-induced bending do not cancel, such as at high RPM with low thrust or low RPM with high thrust, and to reduce gyroscopic bending stresses.

Figures 5, 6, 7, 8, 9, 10, 11:
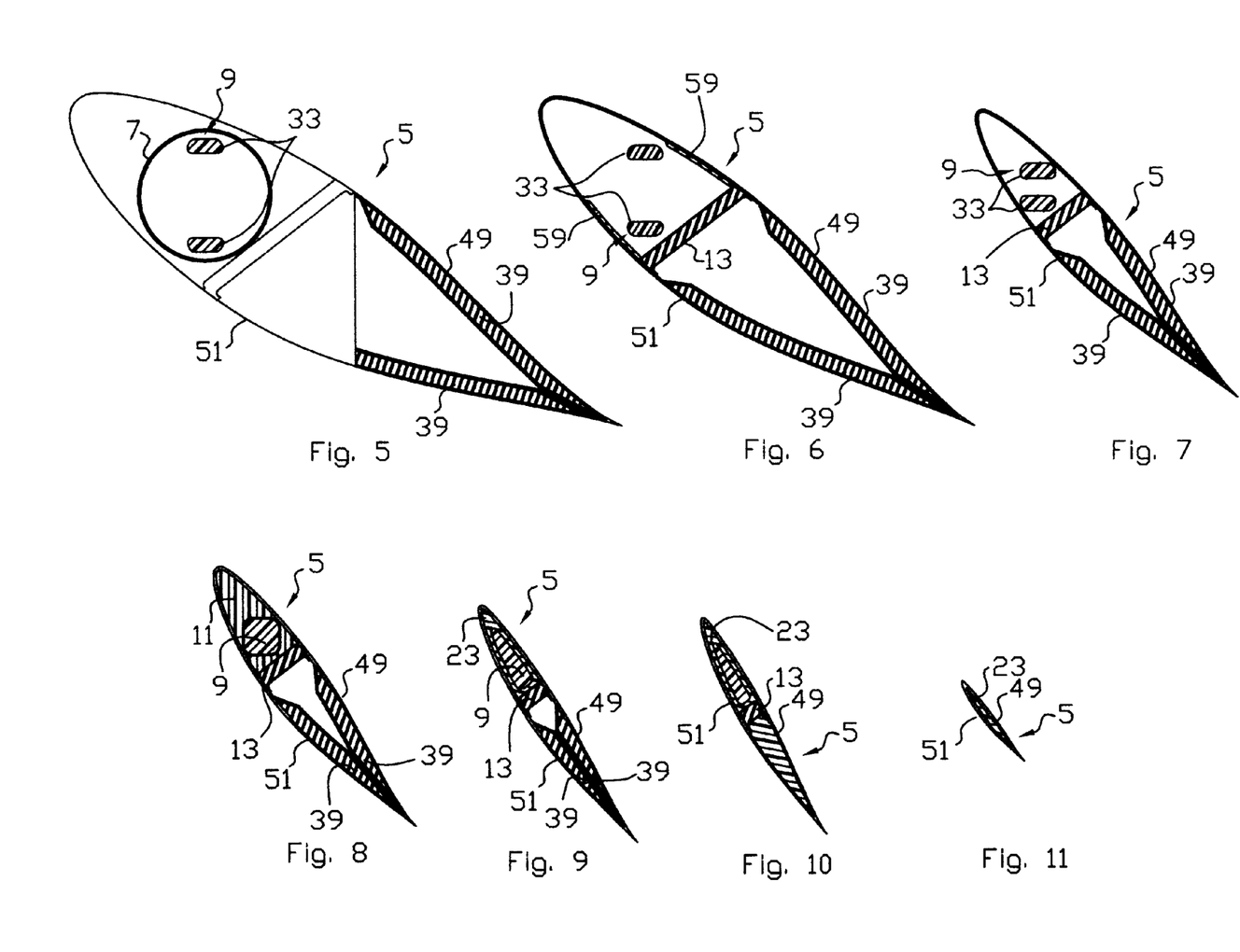
FIG. 5 is a cross section at pusher propeller station 11.25, taken along the line 5—5 of FIG. 1.
FIG. 6 is a cross section at pusher propeller station 15.75, taken along the line 6—6 of FIG. 1.
FIG. 7 is a cross section at pusher propeller station 24.75, taken along the line 7—7 of FIG. 1.
FIG. 8 is a cross section at pusher propeller station 29.25, taken along the line 8—8 of FIG. 1.
FIG. 9 is a cross section at pusher propeller station 33.75, taken along the line 9—9 of FIG. 1.
FIG. 10 is a cross section at pusher propeller station 38.25, taken along the line 10—10 of FIG. 1.
FIG. 11 is a cross section at pusher propeller station 44, taken along the line 11—11 of FIG. 1.

Blade 5 and cuff 7 are constructed as a single unit, with an upper skin 49 forming the upper airfoil surface and a lower skin 51 forming the lower airfoil surface. As shown in FIG. 5, blade cuff 7 has a neck with circular cross section at the point where it passes through spinner 1, to reduce the size of the hole in spinner 1 required to allow blade 5 to change pitch, and thereby to reduce the drag of the intersection between propeller 3 and spinner 1. Upper skin 49 and lower skin 51 each comprise layers of high modulus fabric in an epoxy matrix. At least one layer of fabric throughout the skins is oriented at a ±45 degree angle to the span to provide torsional stiffness. Some unidirectional fabric is oriented parallel to the span to control out-of-plane stiffness of the blade. The rear inboard section of both skins 49, 51 are constructed with a sandwich of composite fabric around structural foam 39 (FIG. 1), such as PVC foam. Once blade skins 49 and 51 are bonded together, blade 5 and cuff 7 form a torsionally stiff torque tube. The leading edge junction between upper skin 49 and lower skin 51 is reinforced with an interior doubler (not shown). The leading edge 52 (FIG. 1) of the outer half of blade 5 is protected from nicks by a stainless steel strip (not shown) stretched to fit exactly.

The airfoil sections of blade 5, shown in FIGS. 5 through 11, are selected based mainly on aerodynamic considerations although they must provide internal space for twisting of spar 9. The chord at each station is selected to be close to the theoretical optimum of the chord at the ¾ radius times 0.75 divided by the percent radius. The airfoil section incidence (chordline angle relative to the plane of rotation) at each station is selected such that the angle of attack (chordline angle relative to the resultant airflow due to forward speed and propeller rotation) is a compromise for best efficiency between takeoff, climb, and cruise. The tip has less incidence, since the blade tip moves through the air faster than the blade root. The combination of chord and incidence at each station is chosen to provide a nearly uniform acceleration of air over the entire propeller disk area. As best seen in FIG. 1, the blade tip is swept to reduce noise and increase efficiency by reducing compressibility losses at high tip mach numbers. From the leading edge 52 of each blade 5 at a location of approximately 85 percent radius, the propeller blade 5 is gradually swept rearward in a convex curve to the tip of the blade 5.

Referring again to FIG. 1, blade 5 is bonded to spar 9 from station 28.5 (near section line 8—8) to the blade tip. Between station 9 and station 28.5, blade 5 is hollow and not connected to spar 9. Thus in this inner portion, blade 5 is free to rotate relative to spar 9 and spar 9 can twist relative to blade 5. Pitch control forces are applied to blade cuff 7 at pitch horn 21, which blade cuff 7 transfers to blade 5, which pivots on spherical bearing 43. Torque applied to the end of blade 5 is transferred to rib 11 and spar 9 at station 28.5 where the three are bonded together. The result is that pitch control forces on cuff 7 twist spar 9 from station 4 to 28.5, changing the pitch of blade 5 without twisting blade 5. During a pitch change, cuff 7 rotates the entire blade 5 relative to root block 35 without any twisting occurring in the blade, rather, twisting will occur in the inner portion of spar 9 between root block 35 and station 28.5. Referring to FIG. 2b, notice that centrifugal force acting on blade 5 is not carried by spherical bearing 43 because it slidably engages pin 45. Only thrust and drag loads, which are relatively low, are carried by spherical bearing 43. Also, spherical bearing 43 assures that bending moments from blade 5 are not transferred to spar 9.

Shear web 13 (FIGS. 6–10) is bonded to upper skin 49 and lower skin 51 for its entire length, to provide a shear connection between them to make blade 5 stiffer against bending, and to help to withstand internal air pressure due to centrifugal force and external aerodynamic forces. Shear web 13 is made of ±45 degree high modulus composite fabric sandwiched around structural foam. Referring to FIG. 1, the volume of blade 5 surrounded by rib 11, shear web 13, and the leading edge and the area surrounded by line 53, shear web 13, and the trailing edge 48 are filled with a bonding mix 23 made of epoxy and flexibility agent. Vent hole 31 in upper skin 49 is located just inboard of the junction between bonding mix 23 and shear web 13 so that air and water can bleed out.

Figure 3:
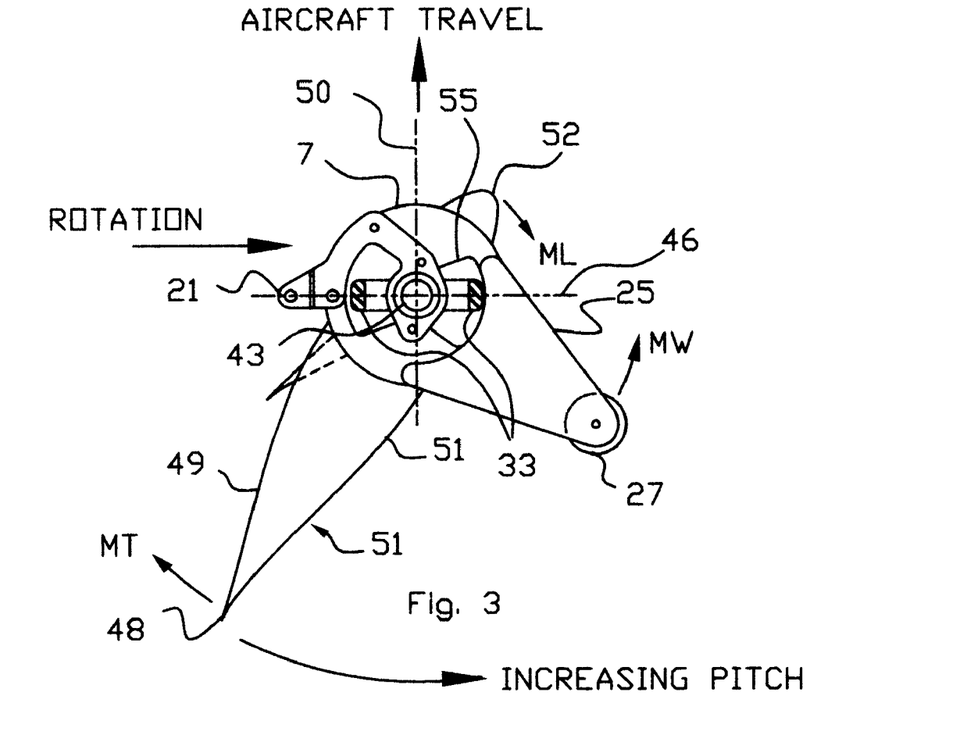
FIG. 3 is a sectional view of the pusher propeller of FIG. 1 taken along the lines 3—3 of FIG. 1.

FIG. 3 shows section 3—3 from FIG. 1, showing skins 49 and 51, spar caps 33, pitch horn 21, blade cuff 7, weight arm 25, weight 27, and the spar clearance hole 55 in blade cuff 7 which allows spar 9 clearance to twist. The cross section of spar 9 at station 5 is shown. Pitch horn 21 and the mounting for spherical bearing 43 are in the same piece of metal for strength in bolting to cuff 7.

A counterweight 27 is mounted to a rigid arm 25 which is attached to cuff 7 for pivotal movement with cuff 7 during pitch changes. Arm 25 extends rearward in the embodiment shown, perpendicular to plane of rotation 46. Counterweight 27 is thus on the same side of the plane of rotation 46 of the blades 5 as a trailing edge 48 of each of the propeller blades. Also, counterweight 27 is on the opposite side of a line 50 perpendicular to the plane of rotation 46 and passing through the pitch pivotal axis at bearing 43. Line 50 is parallel to the aircraft direction of travel. Weight arm 25 and counterweight 27 together form a device for reducing the forces necessary for pitch control when the propeller is rotating at high speed and is therefore subject to high centrifugal force. It is an effect of centrifugal force that all masses being rotated will tend to move toward the plane of rotation 46. Since blade 5 has an angle relative to the plane of rotation 46, rotation causes a force on blade 5 tending to reduce that angle, which produces a centrifugal pitching moment. All masses behind the plane of rotation 46 (relative to the direction of travel of the aircraft), such as the propeller trailing edge 48, tend to move forward toward the plane of rotation 46, and all masses ahead of the plane of rotation 46, such as the propeller leading edge 52, tend to move rearward toward the plane of rotation 46. These two forces add, since they both tend to cause a negative pitching moment ML and MT (clockwise in the view shown in FIG. 3).

To counteract this effect, counterweight 27 held by arm 25 is positioned such that centrifugal force tending to move it toward the plane of rotation 46 causes a positive pitching moment MW (counterclockwise in the view shown in FIG. 3), canceling some or all of the centrifugal pitching moment ML plus MT of the propeller itself. The weight arm 25 may be formed of composite materials, such as fiberglass in an epoxy matrix, and is bonded to the end of the cuff 7. Most airfoil sections also have an aerodynamic pitching moment which acts to pitch the airfoil down and adds to the centrifugal pitching moment.

The centrifugal pitching moment of a counterweight mounted on an arm of negligible weight is described by the following equation:

$$PM = \sin(f) \times \cos(f) \times L^2 \times W \times RPM^2 \times 0.0000284$$

where:
PM is the pitching moment in inch pounds
f is the angle in degrees between the arm and the plane of rotation at the current propeller pitch setting
L is the length of the arm in inches from the blade pitch axis, W is the weight on the arm in pounds
RPM is the propeller rotational speed in revolutions per minute 0.0000284 is a constant necessary to use the above units, equal to:

$$\frac{(4 \times pi^2)}{(60 \times 60 \times g \times 12)}$$

where g is the gravitational constant.

Changing the pitch of blade 5 changes the pitching moment of counterweight 21, changes the pitching moment of blade 5 itself, and changes the balance of centrifugal pitching moment between blade 5 and counterweight 27. The exact angle of arm 25 relative to propeller blade 5 (which may be fixed or adjustable but does not change while in operation) is selected to provide the desired pitching moment cancellation at various pitch angle and rotation rate combinations. Counterweight 27 can be sized and positioned to reduce the pitching moments ML and MT but keep a small clockwise (as viewed in FIG. 3) pitching moment, or to more than counteract all the centrifugal and aerodynamic pitching moments of the propeller at all pitch positions, so that there is always a counterclockwise force acting on the blade. Either method removes backlash from the pitch control mechanism to reduce the chances of blade weave, the difference being only the behavior in case of a pitch controller or engine failure. There are arguments for either method. Alternately, counterweight 27 could be located forward of plane of rotation 46 and on the same side of perpendicular line 50 as trailing edge 48.

The amount of weight of counterweight 27 depends on the position of arm 25 and its length. An arm twice as long requires one fourth as much weight. The arm length chosen is the maximum length that will fit inside spinner 1 given the weight's range of motion due to pitch change.

Figure 13:
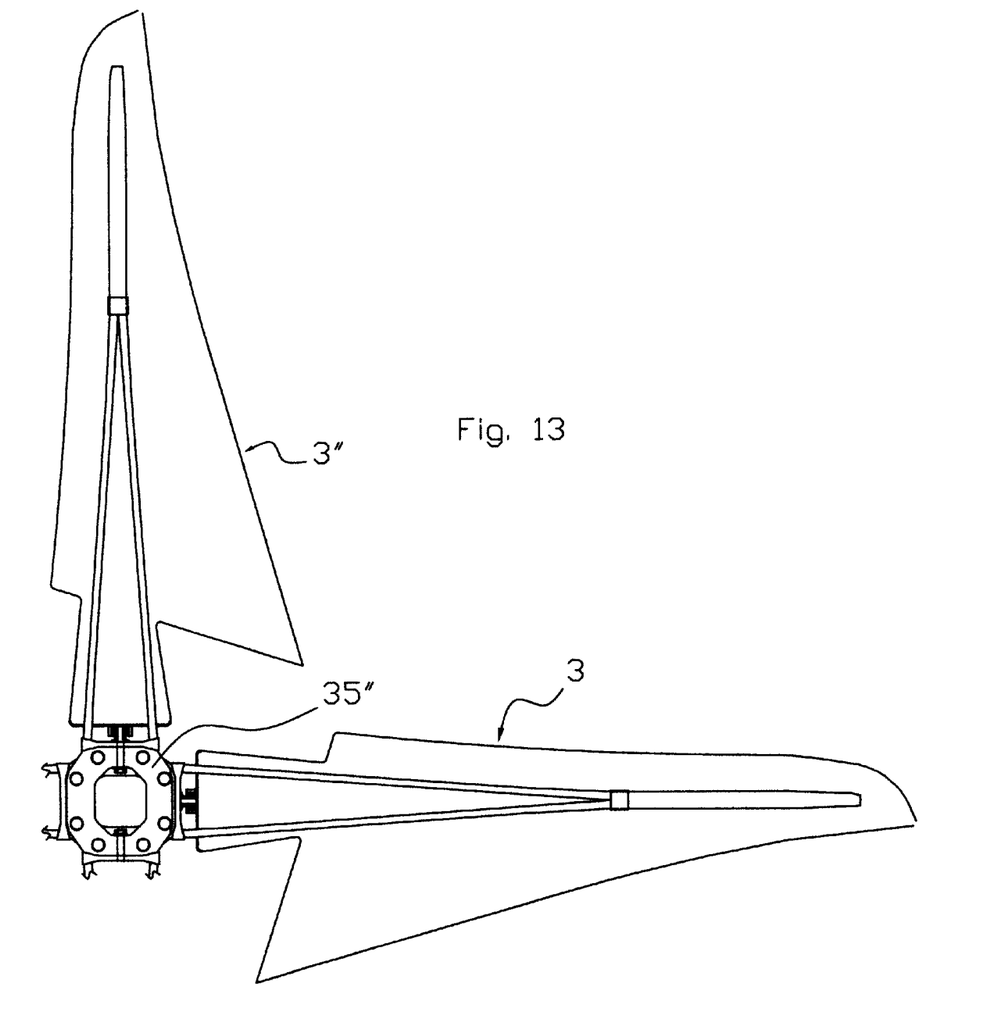
FIG. 13 is a rear view of the spars and cross section of the blades for another alternate embodiment of a propeller constructed in accordance with this invention.

In a two-bladed configuration, spar 9 is bolted to propeller flange 17 using eight bolts. In a four-bladed configuration (FIG. 13), the second propeller 3" would have a root block 35" the same as root block 35 and be mounted on top of the first propeller at a 90 degree angle. Mounting the two propellers 3 and 3" on top of each other is practical because the propeller hubs 35, 35" are flat. In a six-bladed configuration (not shown), the three propellers would be mounted at 60° angles using a propeller flange having 6 bolts, each bolt clamping all three propellers.

Figure 4:
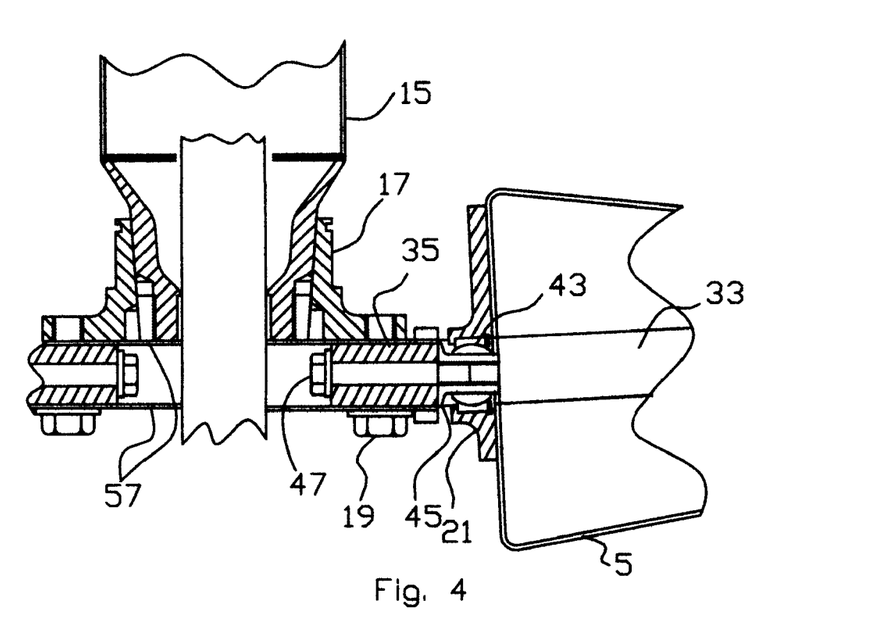
FIG. 4 is an enlarged sectional view of the propeller root shown in FIG. 1.

FIG. 4 shows a horizontal section through the propeller root. Face plates 57 are bonded to either side of root block 35 and root block extensions 37, to reinforce the bond between root block extensions 37, spar caps 33, and root block 35. Also more clearly visible is the pre-coning of spar caps 33 just outboard of root block 35.

FIG. 5 shows the cross section of the propeller at station 11.25, just inboard of where blade cuff 7 passes through spinner 1 (FIG. 1). Spar 9 has approximately 0.2 inch clearance to twist inside blade cuff 7, allowing for some bending of blade 5. Shear web 13 (shown as hidden lines) is positioned as far forward in blade 5 as possible without interfering with the twisting of spar 9. Foam 39 has composite fabric on both sides to form a stiff sandwich structure.

FIG. 6 shows the cross section of the propeller at station 15.75. The spacing of spar caps 33 begins to narrow or converge immediately after the root block, therefore it is narrower at this station. The outer corners of spar caps 33 of spar 9 are rounded throughout to reduce stress concentrations that would otherwise occur because of the combination of twisting, bending, and centrifugal force. Unidirectional fabric 59 is oriented spanwise to resist out-of-plane bending forces in blade 5, by forming a C-beam with shear web 13.

FIG. 7 shows the cross section of the propeller at station 24.75. Spar caps 33 are almost touching. The cross section of spar caps 33 is slightly greater near this station than at any other station since spar twisting for pitch control creates a stress that is highest near where the two spar caps 33 meet. However, the cross sectional area is otherwise nearly constant throughout the span.

FIG. 8 shows the cross section of the propeller at station 29.25. Spar caps 33 have merged into one rectangular spar. This rectangle is larger than necessary to withstand the centrifugal force at this station; it is sized to withstand a bending moment that exists at the point where the spar caps 33 meet. The bending moment is caused by twisting of the spar 9. Rib 11 fills the space around spar 9 ahead of shear web 13, and is bonded to the spar 9, shear web 13, and skins 49,51. A small air-bleed hole (not shown) is provided in shear web 13, slightly inboard of rib 11, to allow any water in the forward part of the blade to pass into the aft section of blade 5 and then out of hole 31 (FIG. 1).

FIG. 9 shows the cross section at station 33.75, in the region where spar 9 is bonded to blade 5. Even though there is no spar twist or significant bending in this region, and centrifugal force is reduced since there is less mass outboard, spar 9 is not reduced in cross sectional area toward the tip, to maximize the bond area between it and blade 5. Bonding mix 23 fills the space around spar 9 ahead of shear web 13.

FIG. 10 shows the cross section at station 39. From station 35 to the tip, the entire interior of the blade is filled with bonding mix 23, since the aerodynamic forces are highest in this region. FIG. 11 shows the cross section at station 44.4, in the region beyond the tip of spar 9. The blade has only skins 49 and 51 completely filled with bonding mix 23 to provide strength, but these are sufficient because of the small amount of thrust and centrifugal force at this station.

Figure 12:
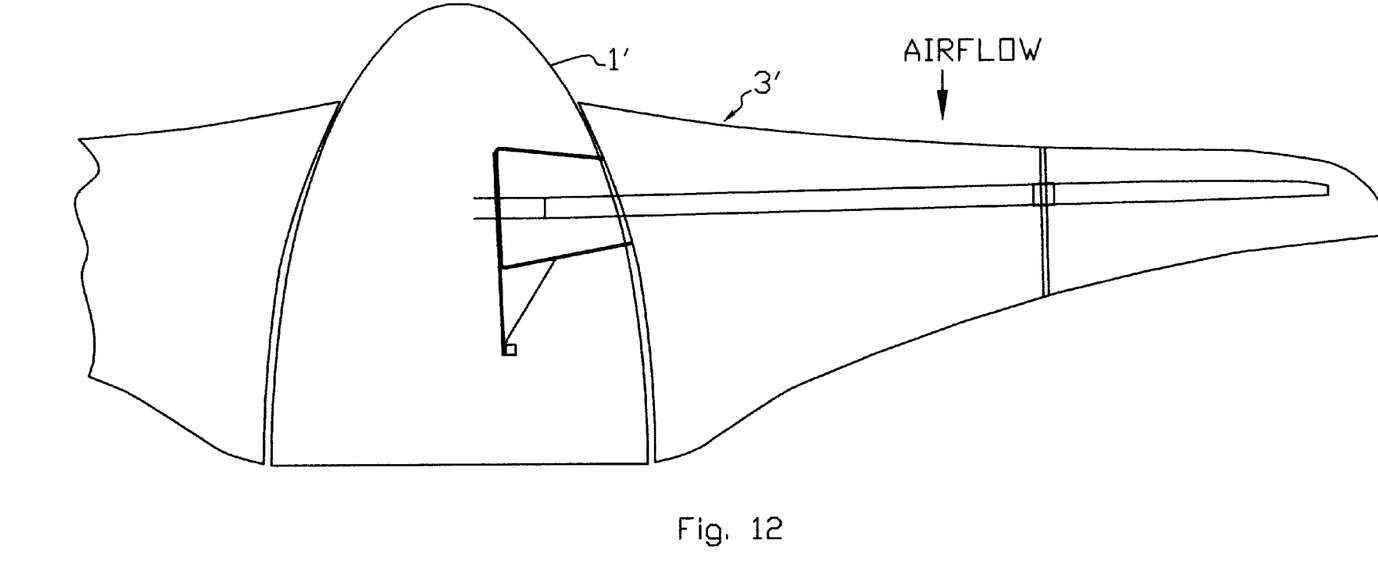
FIG. 12 is a plan view of an alternate embodiment of a propeller constructed in accordance with this invention.

FIG. 12 shows an alternate configuration of a propeller 3' for a tractor aircraft (in which the propeller pulls the aircraft through the air). The primary difference between the pusher and tractor configurations is in the intersection with the spinner. The tractor configuration has less blade area near the root at the trailing edge and more area near the leading edge because of the taper necessary to match the spinner 1'. Structurally the two configurations could be the same.

The invention has significant advantages. The preferred embodiment has approximately one-third the weight of controllable-pitch metal propellers rated for the same horsepower, places less gyroscopic loads on the drive shaft, and allows more flexibility in airfoil selection, chord, and twist than metal or wooden propellers. The blade assembly cross section provides high in-plane stiffness and low out-of-plane stiffness. The out-of-plane pre-cone configuration of the spar results in low out-of-plane bending stresses. The counterweight assembly reduces pitching moments.

The invention is not limited to the embodiments described above; on the contrary the invention extends to any variant that reproduces the above-described essential characteristics by equivalent means.

What is claimed is:

1. An aircraft blade assembly, comprising:
   a hub adapted to be connected to a drive shaft for rotation therewith;
   a blade on each side of the hub and extending outward along a blade axis, each of the blades having a cuff adjacent to the hub and a tip, the blades when rotated by the hub defining a plane of rotation;
   a pitch horn mounted to each of the cuffs and adapted to be connected to a pilot controlled linkage for pivoting each of the blades relative to the hub about the blade axis for making pitch changes;
   a spar mounted to the hub and extending continuously from approximately one of the tips to approximately the other of the tips, the spar having two spar caps separated from each other in the plane of rotation at the hub; and
   each of the blades being mounted to and enclosing the spar caps, wherein each blade has an inner portion extending outward from each of the cuffs that is hollow and free of engagement with the spar caps to enable twisting of an inner portion of the spar caps while each of the blades is pivoted about the blade axis during the pitch changes.

2. The blade assembly according to claim 1, further comprising a pair of spanwise oriented rods, each rotatable supporting a bearing, the rods and bearings being connected between the cuffs and the hub to facilitate pivoting of each of the blades relative to the hub for pitch changes.

3. The blade assembly according to claim 1 wherein:
   each of the blades has an outer portion which extends from the inner portion to one of the tips;
   the outer portion of each of the blades is bonded to an outer portion of the spar such that pivoting movement of each of the blades about the blade axis causes the outer portion of the spar to pivot in unison with the outer portion of each of the blades.

4. The blade assembly according to claim 1, wherein the spar caps gradually converge toward each other from the hub and join each other and the blades at a junction in an outer portion of the spar, and wherein the inner portions are hollow from the cuffs to the junctions.

5. The blade assembly according to claim 1, wherein the spar has an out-of-plane bend in a direction that the spar would be bent by thrust, the bend occurring immediately outboard of the hub.

6. The blade assembly according to claim 1, in which the spar has a ratio of in-plane stiffness to out-of-plane stiffness exceeding 20.

7. The blade assembly according to claim 1, further comprising a spinner which encloses the hub, the spinner having a hole on each side for receiving an inner end of each of the blades; and wherein
   each of the cuffs of the blades has a circular neck portion which inserts into one of the holes in the spinner, the neck having a diameter larger than a cross sectional extent of the spar at the hub to enable pivotal movement of the neck relative to the spar for pitch changes.

8. The blade assembly according to claim 1, wherein each of the blades has a blade chord varying with a blade assembly radius such that the blade chord measured at any selected point from the hub is approximately equal to the blade chord measured at ¾ of the blade assembly radius times 0.75 divided by the percent of the radius at said selected point.

9. The blade assembly according to claim 1, further comprising:
   a progressively swept leading edge on each of the blades from a point approximately 85 percent the length of each of the blades to the tip of each of the blades.

10. The blade assembly according to claim 1, further comprising a vent hole near the tip of each of the blades.

11. The blade assembly according to claim 1, wherein:
   each of the blades has a leading edge on an upstream side of the plane of rotation and a trailing edge on a downstream side of the plane of rotation; and wherein the propeller assembly further comprises:

an arm attached to each of the blade cuffs; and a counterweight mounted to each of the arms, the arm being attached at an angle such that the counterweight is on one side of the plane of rotation along with one of the edges of each of the blades, and wherein the counterweight is on an opposite side from said one of the edges of a line perpendicular to the plane of rotation and passing through the pivot axis.

12. The blade assembly according to claim 1, wherein each of the blades has a leading edge forward of the plane of rotation and a trailing edge rearward of the plane of rotation and wherein the propeller assembly further comprises:

an arm attached to each of the blade cuffs for pivotal movement with the cuff and extending generally perpendicular to a span of the propeller blades; and a counterweight mounted to each of the arms on a same side of the plane of rotation as a selected one of the edges of the blades, the counterweight further being on an opposite side from said selected one of the edges of a line perpendicular to the plane of rotation and passing through the pivot axis.

13. An aircraft blade assembly, comprising:

a hub adapted to be connected to a drive shaft for rotation therewith;

a blade on each side of the hub, each of the blades having a tip;

a spar mounted to the hub and extending continuously from approximately one of the tips to approximately the other of the tips, the spar having two spar caps separated from each other at the hub;

each of the blades being mounted to and enclosing the spar caps; wherein each of the blades has an inner portion which joins and is pivotal relative to the hub and an outer portion which extends to one of the tips;

the outer portion of each of the blades is bonded to the spar;

the inner portion of each of the blades has a cavity free of joinder to the spar caps to enable twisting of the spar caps when the blades are pivoted relative to the hub for pitch changes; and a pitch horn is mounted to each of the blades adjacent the hub and adapted to be connected to a pilot controlled linkage for making the pitch changes; and wherein the blade assembly further comprises:

a spherical bearing engaging a spanwise oriented rod mounted between the hub and each of the blades to facilitate the pivoting of the inner portion of each of the blades.

14. An aircraft blade assembly, comprising:

a hub having an axis and adapted to be connected to a drive shaft for rotation therewith;

a propeller blade on each side of the hub, each of the blades having cuff at the hub, an inner portion extending outward from the cuff a selected distance, and an outer portion extending outward from the inner portion and terminating in a tip;

a spar mounted to the hub and extending continuously from approximately one of the tips to approximately the other of the tips, the spar having two spar caps separated from each other at the hub in a plane perpendicular to the axis, the spar caps converging toward each other in the inner portion of the blade and being joined in the outer portion of the blades; and each of the blades being mounted to and enclosing the spar caps, with the outer portion of each of the blades being bonded to the spar for pivotal movement therewith and the inner portion of each of the blades being hollow and free of joinder to the spar caps to enable twisting of the spar caps relative to the blades while the blades are pivoted relative to the hub for pitch changes; and a pitch horn mounted to the cuff of each of the blades adjacent the hub and adapted to be connected to a pilot controlled linkage for making the pitch changes.

* * * * *